(12) United States Patent
Morlang et al.

(10) Patent No.: US 7,263,192 B2
(45) Date of Patent: *Aug. 28, 2007

(54) ESTABLISHING AN ENCRYPTED SESSION

(75) Inventors: Keven P. Morlang, Fair Oaks, CA (US); Rajeev Grover, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 813 days.

This patent is subject to a terminal disclaimer.

(21) Appl. No.: 10/103,020

(22) Filed: Mar. 20, 2002

(65) Prior Publication Data

US 2003/0182576 A1    Sep. 25, 2003

Related U.S. Application Data

(63) Continuation-in-part of application No. 10/077,465, filed on Feb. 14, 2002.

(51) Int. Cl.
*H04L 9/00* (2006.01)
*H04L 9/28* (2006.01)

(52) U.S. Cl. .................. 380/277; 713/151; 713/168

(58) Field of Classification Search ................ 380/277; 713/151, 168
See application file for complete search history.

(56) References Cited

U.S. PATENT DOCUMENTS

| | | | | |
|---|---|---|---|---|
| 5,410,602 | A | * | 4/1995 | Finkelstein et al. ......... 380/281 |
| 6,070,245 | A | * | 5/2000 | Murphy et al. ................ 726/3 |
| 6,275,856 | B1 | * | 8/2001 | Hirata et al. ................ 709/224 |
| 6,449,279 | B1 | * | 9/2002 | Belser et al. ................ 370/397 |

OTHER PUBLICATIONS

Theodore Ts'o "Telnet Data Encryption Option" Sep. 2000 pp. 1-8.*

* cited by examiner

*Primary Examiner*—Nasser Moazzami
*Assistant Examiner*—Eleni A. Shiferaw

(57) ABSTRACT

A method of establishing an encrypted session. An identifier is sent from a first node to a second node via a first connection. Either an encryption algorithm or an identifier of the encryption algorithm is also sent to the second node. The second node is also sent either an encryption key or an identifier of the encryption key. A command is received on a second connection indicating that an encrypted session is desired. In response to receiving a command including the identifier via the second connection, the encrypted session is established, using the encryption algorithm.

24 Claims, 15 Drawing Sheets

400

| Name | Code (Decimal) | Description |
|---|---|---|
| TELOPT_ASSOC | 53 | Logical Associate Option |
| SNDID | 42 | Logical Associate Suboption |
| SE | 240 | Suboption End |
| SB | 250 | Suboption Begin |
| WILL | 251 | Option Negotiation |
| WILL | 252 | Option Negotiation |
| DO | 253 | Option Negotiation |
| DONT | 254 | Option Negotiation |
| IAC | 255 | Interpret As Command |

| Name | Code (Decimal) | Description |
|---|---|---|
| TELOPT_ASSOC | 53 | Logical Associate Option |
| SNDID | 42 | Logical Associate Suboption |
| LOGICAL_ENCRYPT | XX | Encrypt Based on Associated Connection |
| SE | 240 | Suboption End |
| SB | 250 | Suboption Begin |
| WILL | 251 | Option Negotiation |
| WILL | 252 | Option Negotiation |
| DO | 253 | Option Negotiation |
| DONT | 254 | Option Negotiation |
| IAC | 255 | Interpret As Command |

FIG. 11

ESTABLISHING AN ENCRYPTED SESSION

RELATED APPLICATION

This application is a Continuation-in-Part of co-pending commonly-owned U.S. patent application Ser. No. 10/077,465 filed Feb. 14, 2002, entitled "METHOD OF ESTABLISHING A LOGICAL ASSOCIATION BETWEEN CONNECTIONS" to Morlang et al.

TECHNICAL FIELD

The present invention relates to the field of networked computers. Specifically, the present invention relates to a method for establishing an encrypted session between two nodes.

BACKGROUND ART

Establishing an encrypted data session is vital to protecting the communication between two electronic devices. A number of encryption algorithms exist for securely protecting such communication. Clearly both devices must know each other's encryption algorithm and have an encryption/decryption key in common. However, in some cases the two devices may be communicating with each other for the first time and may not share an encryption protocol or algorithm in common. Additionally, they clearly will not both have the essential encryption key in this case.

Some conventional methods that allow devices to negotiate an encryption algorithm are limited in that they require that the nodes be capable of performing a common encryption algorithm. However, the nodes may fail to agree on an encryption algorithm, because they have no algorithm in common. For example, the Telnet protocol requires that both parties agree on the encryption algorithm. It is possible that the parties do not have an encryption algorithm in common, in which case the conventional communication protocol does not provide a means for the nodes to encrypt the communication.

A second limitation of conventional methods is that even if two devices have an encryption algorithm in common, they may not be able to agree to use it because the communication protocol does not support that encryption algorithm. For example, the Telnet protocol limits the types of encryption that are allowed during a Telnet session by requiring the parties to negotiate the encryption algorithm by passing the other node a specific value to identify an encryption protocol. However, the encryption algorithms supported are limited. Thus, users are unable to select an encryption algorithm that is not supported in the protocol and may be forced to use an encryption algorithm that is not their best choice.

Thus, one problem with conventional protocols is that two nodes that may have an encryption algorithm in common may be unable to negotiate to use it, using the conventional protocol. Another problem with conventional protocols is that each node must support an encryption algorithm that the other is willing to support, otherwise they are not able to negotiate to use encryption via the conventional protocol.

DISCLOSURE OF THE INVENTION

The present invention pertains to a method of establishing an encrypted session. An identifier is sent from a first node to a second node via a first connection. Either an encryption algorithm or an identifier of the encryption algorithm is also sent to the second node. The second node is also sent either an encryption key or an identifier of the encryption key. A command is received on a second connection indicating that an encrypted session is desired. In response to receiving a command including the identifier via the second connection, the encrypted session is established, using the encryption algorithm.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 is a table illustrating commands defined in embodiments of the present invention to establish a logical association between connections.

FIG. 11 is a table illustrating commands defined in embodiments of the present invention to establish an encrypted session.

BEST MODE FOR CARRYING OUT THE INVENTION

Figure 1:
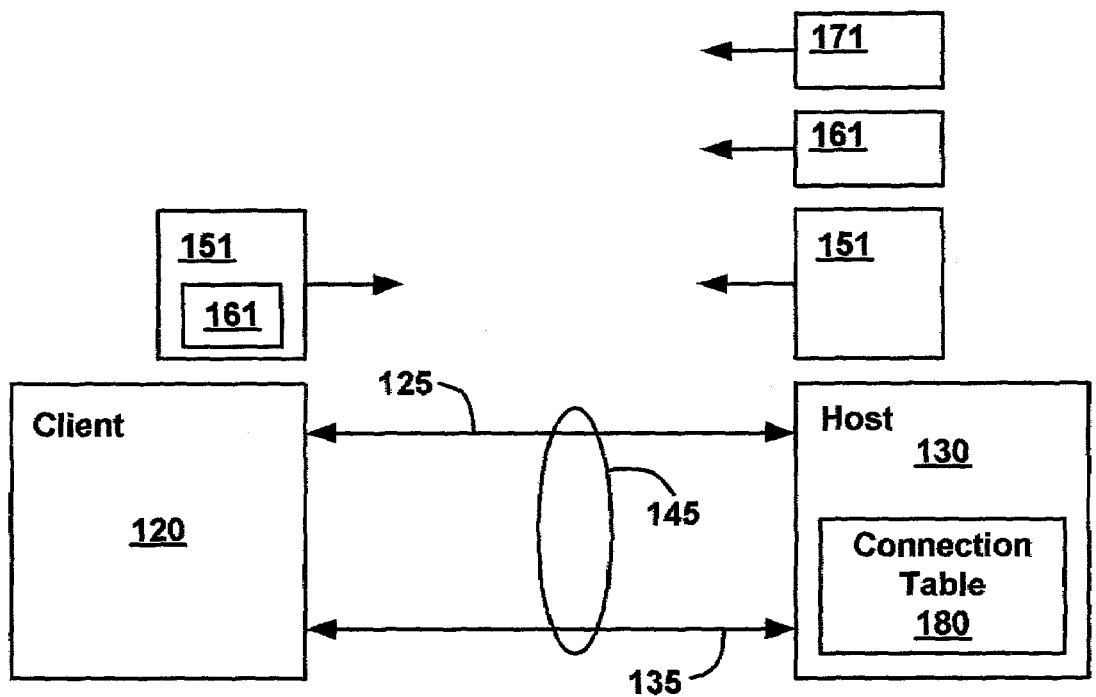
FIG. 1 is a diagram illustrating nodes have connections that are logically associated, in accordance with embodiments of the present invention.

In the following detailed description of the present invention, numerous specific details are set forth in order to provide a thorough understanding of the present invention.

However, the present invention may be practiced without these specific details or by using alternate elements or methods. In other instances well known methods, procedures, components, and circuits have not been described in detail as not to unnecessarily obscure aspects of the present invention.

Embodiments of the present invention allow nodes that do not initially have an encryption algorithm in common establish an encrypted session. Embodiments allow the encrypted session to be established on a second connection that may be of a different type than a first connection. Embodiments allow two nodes to agree on an encryption algorithm to be used via a connection even if a communication protocol used on that connection does not support that encryption algorithm.

Embodiments of the present invention provide a method of establishing an encrypted session. In one embodiment, a first node, such as a server, generates a session identifier and sends it to a second node, for example, a client, via a first connection. The server may store the session identifier in a table, along with an encryption key. The server may also send the client either the encryption key or an identifier of the encryption key. Furthermore, the server may send the client an application program that enables the client to communicate via a second connection, which may be of a different type than the first connection. For example, the first connection may be a connectionless connection and the second connection may be connection oriented connection. However, other connection types may be used for either connection. The server may also send the client an application program for performing an encryption/decryption algorithm. The two application programs may be combined into one program.

After the client establishes the second connection to the server, the server and client may exchange one or more commands that establish that the session on the second connection will be encrypted. The client may pass the server the session identifier, which the server may associate with the encryption key stored in the table. The client and server may then engage in an encrypted session on the second connection.

Embodiments of the present invention allow a logical association to be made between connections that two or more nodes have between them. One of the connections may be connection oriented and the other connectionless, although this is not required. Embodiments allow a client that desires to have a connection oriented connection to contact a server via a connectionless protocol. The server assists in making the connection oriented connection without any manual client intervention, such as, for example, entering additional passwords, session identifiers, etc. Embodiments employ an exchange of Telnet options and/or Telnet sub-option commands between the nodes (e.g., client and server) to establish the logical association between the connections.

A diagram illustrating an example of making a logical association between connections is shown in FIG. 1. The diagram shows two connections that are logically associated and information that is exchanged to establish the logical association. A client node 120 and a host or server node 130 have a first connection 125 between them. Throughout this description, the nodes that share the connections may be referred to as a first node and a second node. The nodes shown in FIG. 1 are exemplary. The first and second nodes may be any two nodes. This first connection 125 may be established by any suitable method, for example, it may be a LAN (Local Area Network), WLAN (Wireless LAN), serial port, modem, etc. The server node 130 sends a datum 161 to the client node 120, which the client node 120 sends back to associate the second connection 135 with the first connection 125.

Referring further to FIG. 1, Telnet commands 151 (e.g., Telnet option, Telnet sub-option commands or the like) are exchanged between the client node 120 and the server node 130. The commands 151 define the actions to be taken at the nodes and, in one embodiment, instruct the server node 130 to logically associate the second connection 135 with the first connection 125 if the client node 120 includes the datum 161 in the exchange. The second connection 135 may be established by any suitable method, for example, it may be a LAN (Local Area Network), WLAN (Wireless LAN), serial port, modem, etc. The exchange of Telnet commands 151 happens automatically, without the client 120 needing to manually enter data to associate the two connections. For example, the server 130 may send the client an applet 171 to automatically perform the exchange of commands 151. Thus, information that the client 120 has already entered, that the server 130 has already generated, or is associated with the first connection 125 in another fashion may be associated with the second connection 135. For example, the server 130 stores a connection table 180 containing connection specific information. This allows the server 130 to associate information from the first connection 125 with the second connection 135.

Figure 2A:
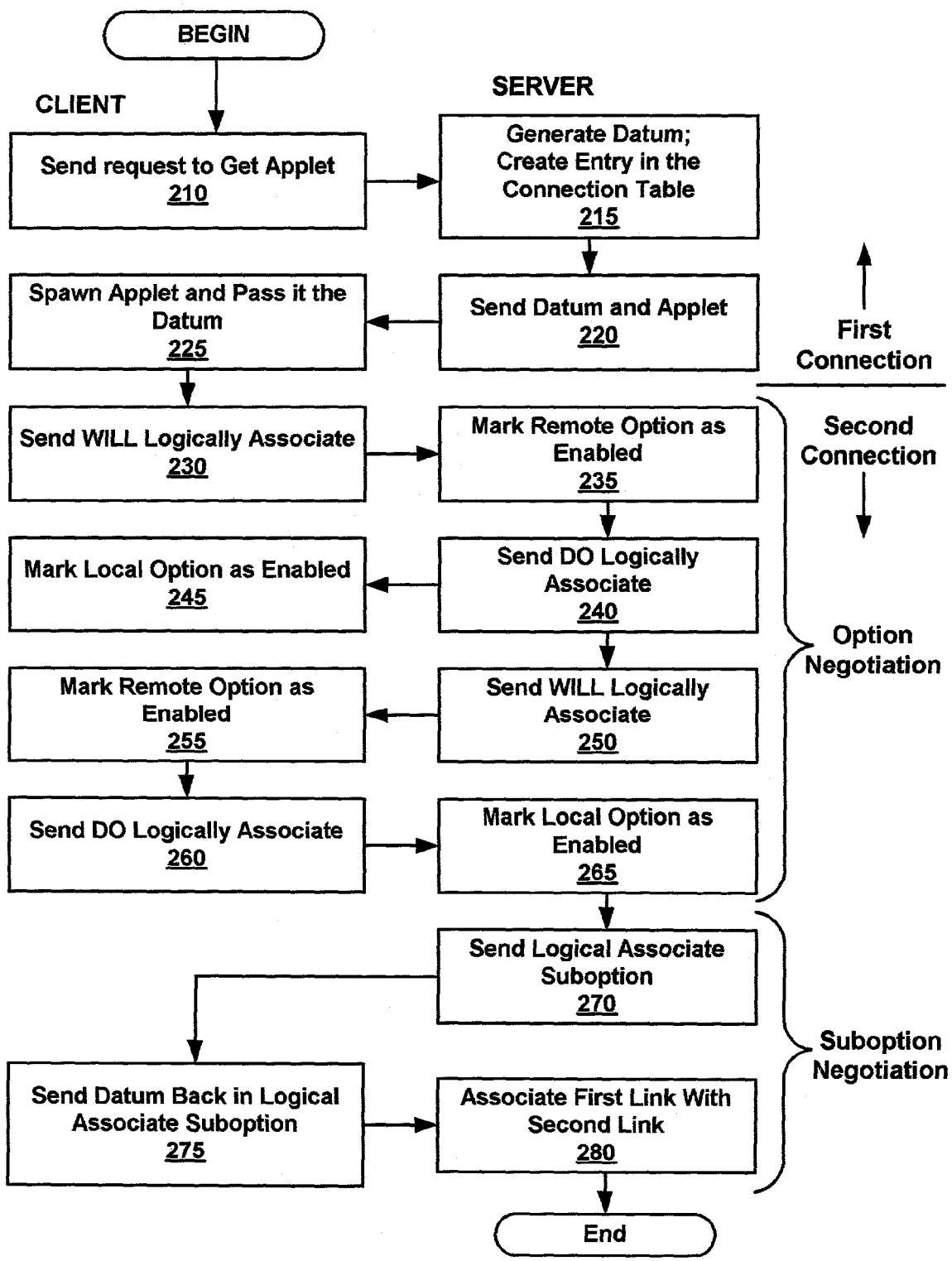
FIG. 2A is a flowchart illustrating steps of a process of nodes exchanging commands to establish a logical association between multiple connections, in accordance with embodiments of the present invention.
Figure 3:
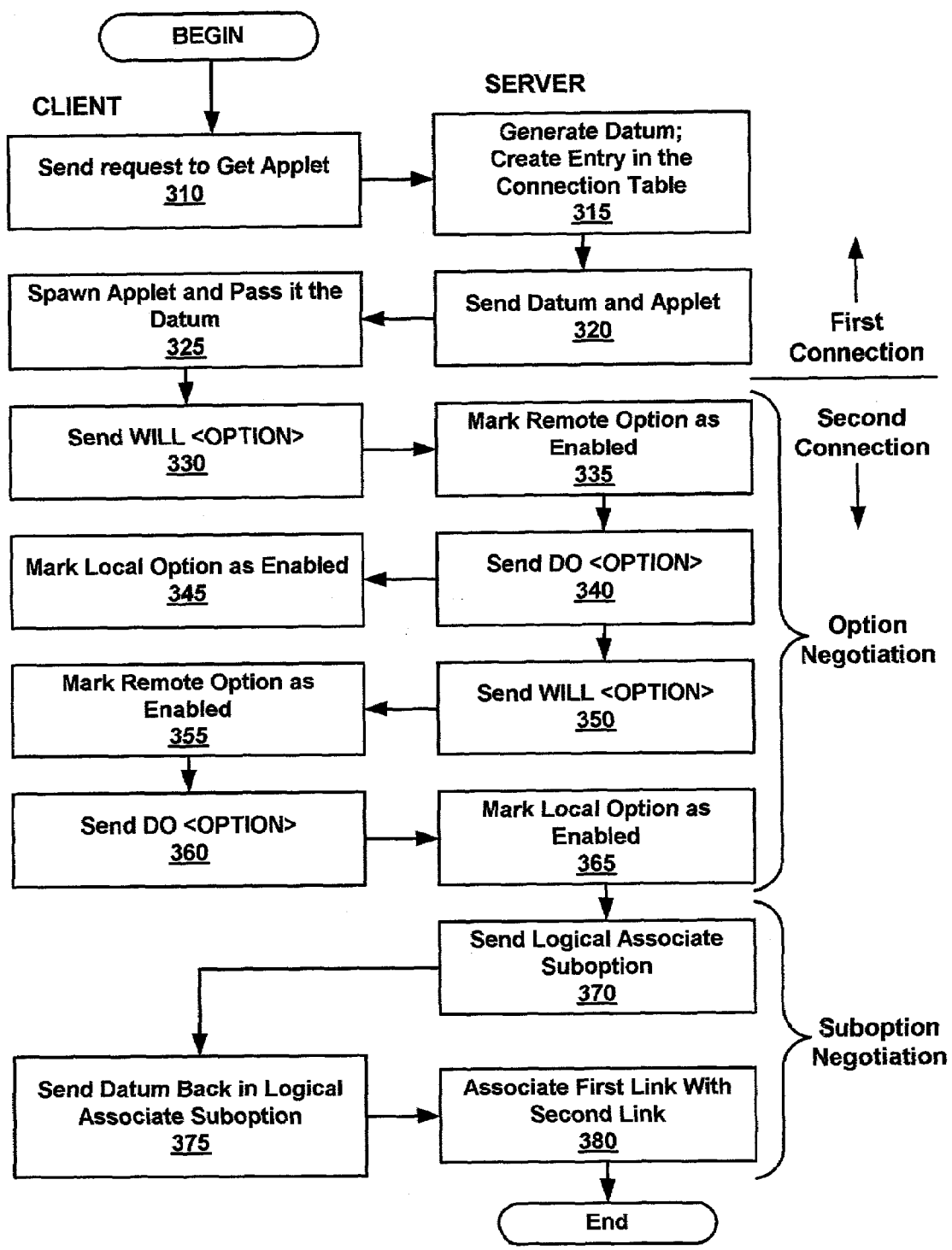
FIG. 3 is a flowchart illustrating steps of a process of nodes exchanging commands to establish a logical association between multiple connections, in accordance with embodiments of the present invention.

In one embodiment of the present invention, nodes exchange a specially designed Telnet sub-option command or negotiation that allows a logical association 145 to be made between two or more connections. Throughout this application, the sub-option command or negotiation may be referred to as a logical association sub-option negotiation. The logical association sub-option may be a part of any Telnet option negotiation. For example, in one embodiment the Telnet logical association sub-option negotiation is preceded by a Telnet logical association option negotiation, as seen in FIG. 2A. In another embodiment, any suitable and allowable Telnet option negotiation may precede the logical association sub-option negotiation, as seen in FIG. 3.

Referring to table 400 in FIG. 4, an embodiment defines a Telnet option with the arbitrary name 'TELOPT_ASSOC' whose exemplary value is decimal 38. Embodiments of the present invention may use other names and values, so long as they are unused by other Telnet options or the like. The Telnet option 'TELOPT_ASSOC' may be used with the Telnet WILL and DO requests to negotiate whether the nodes will support the option of logically associating two or more connections (e.g., it may be used during an option negotiation).

Still referring to FIG. 4, an embodiment defines a Telnet sub-option with the arbitrary name 'SNDID,' whose exemplary value is decimal 42. The present invention may use other names and values, so long as they are unused by other Telnet options, sub-options, or the like. The Telnet sub-option 'SNDID' may be used to negotiate the transfer of the datum 161 that is used to identify the first connection 125 (e.g., it may be used during a sub-option negotiation). Thus, it allows the first connection 125 to be logically associated with the connection being used to transfer the Telnet sub-option (e.g., second connection 135).

Referring now again to the flowchart of FIG. 2A and to the table of FIG. 4, first the client node 120 initiates the establishment of a first connection 125 to the server node 130, in step 210. For example, the client node 120 sends an 'HTTP Get index.html' to the server node 130. However, the present invention is not limited to establishing the first connection via HTTP, for example, the first connection 125 may be via SNMP (Simple Network Management Protocol), or any other connection method. The client node 120 also indicates to the server 130 that it desires to establish a second connection 135, for example, a connection oriented connection.

In step 215, when the server node 130 receives the request, the server node 130 generates a datum 161, which may be used to link the first connection 125 to the second connection 135. For example, the datum 161 may be a session identifier, a connection identifier, or any other identifier to allow the server 130 to recognize, when communicating with a node via a second connection 135, that the node sending it is the node that had the first connection 125. The server node 130 may store the datum 161 in a connection table 180, which also includes connection specific items.

In step 220, the server node 130 sends the datum 161 and an applet 171 to the client node 130. The applet 171 may be used to establish the second connection 135 and may also be used by the client node 120 to walk through the exchange of commands 151 with the server node 130 to establish the logical association 145 between the connections (125, 135). Additionally, the server node 130 may send contextual information such as, for example, user access level, encryption keys, security levels, etc.

In step 225, when the client 130 receives the applet 171, the applet 171 is spawned and passed the datum 161. The applet 171 then attempts to establish a second connection 135 to the server 130. In the present embodiment, the client node 120 and the server node 130 first engage in a specially defined Telnet option negotiation to establish that both nodes wish to support the logical association option. Then, the two nodes engage in a specially defined Telnet sub-option negotiation to cause the logical association between the connections to be established.

Thus, after the second connection 135 is established, in step 230, the client node 120 sends a 'WILL logically associate' request to indicate that the client node 120 wants to enable the logical association option. The client 120 may send the string 'WILL TELOPT_ASSOC' to accomplish this. Referring to the Table of FIG. 4, this may have the hexadecimal value of 'ff fb 35.' As stated herein, the value of the TELOPT_ASSOC option may be any unused value in the Telnet protocol. Throughout this description, the entire string just described and similar strings may be defined as a Telnet command.

In step 235, when the server node 130 receives the request, it marks the remote option as enabled. Then, in step 240, the server node 130 sends a 'DO logically associate' to indicate that the client 120 may enable the option for logical association. The server 130 may send the string 'IAC DO TELOPT_ASSOC' to accomplish this. Referring to the Table of FIG. 4, the hexadecimal values for this string may be 'ff fd 35.' Again, the TELOPT_ASSOC value of 35 hexadecimal is exemplary.

In step 245, in response to the 'DO request' from the server 130, the client node 120 marks the local option as enabled.

Next in step 250, the server 130 sends a 'WILL logically associate' request to indicate it wants to enable the option for logical association on its side. The server 120 may send the string, 'IAC WILL TELOPT_ASSOC' to accomplish this. The hexadecimal values for this string may be 'ff fb 35.' Again, the TELOPT_ASSOC value of 35 hexadecimal is exemplary.

In response to the 'WILL request,' the client 120 marks the remote option as enabled, in step 255. Then, the client 120 sends a 'DO logically associate' request to indicate that the server 130 may enable the option for logical association on the server 130, in step 260. The client 120 may send the string 'IAC DO TELOPT_ASSOC' to accomplish this. The hexadecimal values for this string may be 'ff fd 35.' Again, the TELOPT_ASSOC value of 35 hexadecimal is exemplary.

Upon receiving the 'DO request,' the server 130 marks the local option as enabled, in step 265. At this point, a second connection 135 has been opened, but it is not yet associated with the first connection 125. To achieve this, sub-option commands are exchanged in a sub-option negotiation.

In step 270, the server 130 sends a logical association option with a logical association sub-option. For example, it sends the string, 'IAC SB TELOPT_ASSOC SNDID IAC SE,' which may have the hexadecimal value of 'ff fa 35 2a ff f0.' This instructs the client 120 to send back the datum 161 if it wants to logically associate the two connections. Throughout this description, the entire string just described and similar strings may be defined as a Telnet command.

Then, in step 275, the client 120 sends back the logical association option and sub-option, along with the datum 161. For example, it may send the string, 'IAC SB TELOPT_ASSOC SNDID DATUM IAC SE.' This may have the hexadecimal value of 'ff fa 35 2a 2f <DATUM> ff f0.'

In step 280, the server 130 may take a series of actions. First, the server 130 verifies that the datum 161 is valid. For example, it verifies that the datum 161 is in the connection table 180. It may thus associate the first connection 125 (e.g., an http connection) with the second connection 135 (e.g., a Telnet connection). Furthermore, the server 130 may associate connection specific items that are in the connection table 180 with the second connection 135. At this point, the exchange of commands is complete.

Figure 2B:
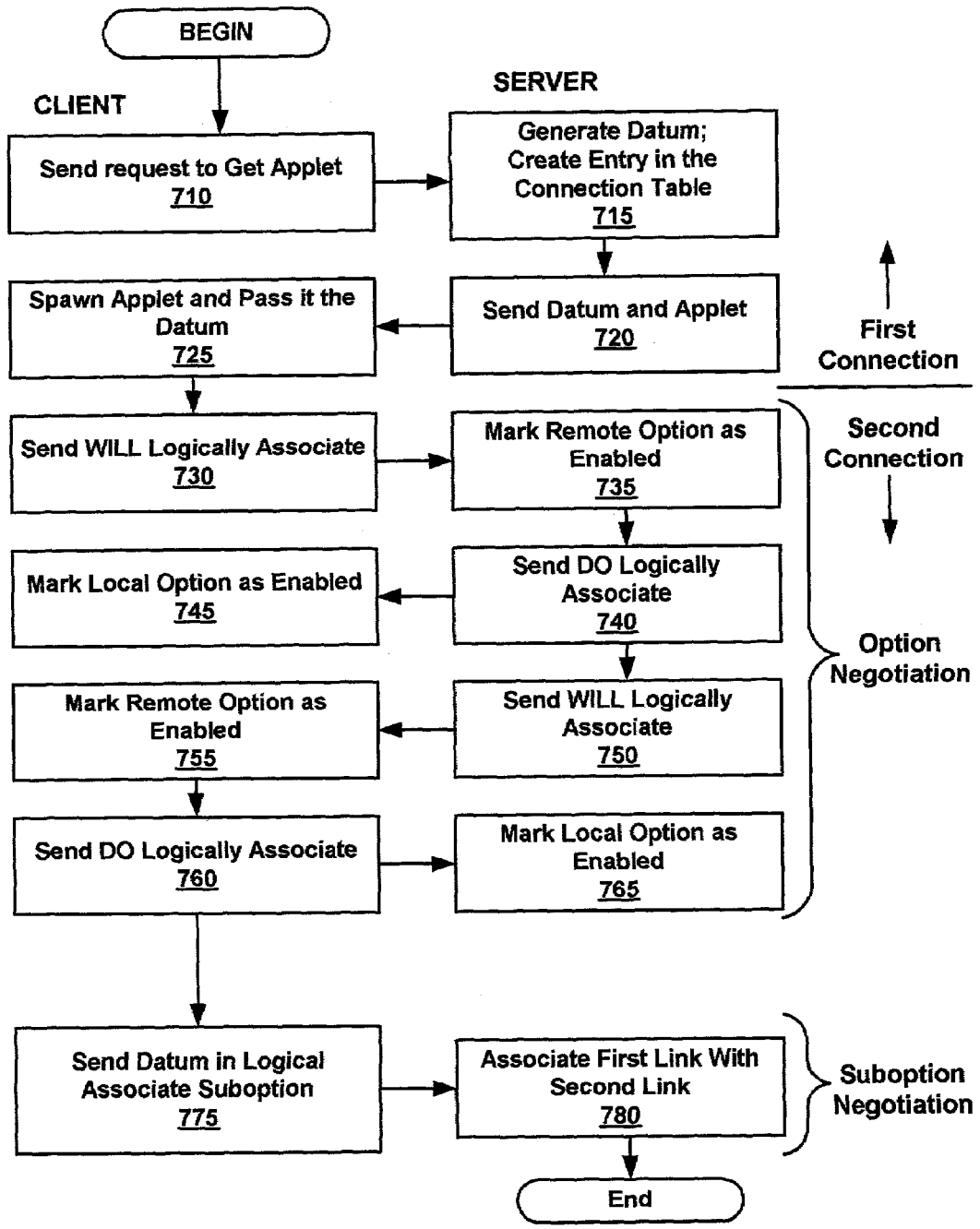
FIG. 2B is a flowchart illustrating steps of a process of nodes exchanging commands to establish a logical association between multiple connections, in accordance with embodiments of the present invention.

The present invention is not limited to the server 130 sending a logical associate sub-option as in step 270. FIG. 2B illustrates steps of a Process in which only a single Telnet command is required as a part of the sub-option negotiation. Steps 710-765 are similar to steps 210-265 and the description associated with FIG. 2A may be referred to for details regarding these steps.

After step 260, in which the client node 120 sends the DO Logically associate command, the client node 120 sends the datum 161 to the server 130 in a Telnet logical associate sub-option, in step 775. However, in this case, the client 120 does not wait for the server 130 to send a send logical associate sub-option. Thus, the sub-option negotiation stage may be stated to requiring only a single Telnet command.

In step 780, when the server 130 receives the command, the server 130 may take a series of actions. First, the server 130 verifies that the datum 161 is valid. For example, it verifies that the datum 161 is in the connection table 180. It may thus associate the first connection 125 (e.g., an http connection) with the second connection 135 (e.g., a Telnet connection). Furthermore, the server 130 may associate connection specific items that are in the connection table 180 with the second connection 135. At this point, the exchange of commands is complete.

The present invention is not limited to preceding the logical association sub-option negotiation with a logical association option negotiation. In another embodiment, the logical association sub-option negotiation may be coupled with any suitable Telnet option negotiation. Referring now to FIG. 3, this embodiment differs from the embodiment of FIG. 2A in that the option that follows all of the WILL and DO requests may be any suitable and permissible option. For example, to perform the option negotiation, the string may be 'IAC WILL <OPTION_NAME>.'

Referring to FIG. 3, steps 310-320 are essentially the same as the analogous steps in FIG. 2A. In steps 330-365, the client 120 and server 130 perform an option negotiation in which they exchange WILL and DO commands in a similar fashion as described in the embodiment of FIG. 2A.

Still referring to FIG. 3, after negotiating the option (e.g., exchanging WILL and DO), the nodes engage in sub-option negotiation in a similar fashion to the embodiment shown in FIG. 2A. For example, in step 370 to send the sub-option, the server 130 may send the string 'IAC SB <OPTION_NAME> SNDID IAC SE.' The client 120 may respond by sending the string 'IAC SB <OPTION_NAME> SNDID <DATUM> IAC SE,' in step 375. The exchange of commands in FIG. 3 then ends. The process completes by the server 130 associating the first connection 125 with the second connection 135, in step 380.

FIG. 3 may be modified by skipping step 370, in a similar fashion to the embodiment illustrated in FIG. 2B. Thus, this embodiment only requires a single Telnet command to establish the association between the two communication links, although other Telnet commands may be used for other purposes.

The present invention is not limited to the logical association 145 being between only two connections. Furthermore, the present invention is not limited to the logical association 145 between connections involving only two nodes. Rather, embodiments of the present invention may establish a logical association 145 between a group of connections. Embodiments may establish multiple logical associations 145 between a group of connections and a single connection. Furthermore, embodiments form a logical association between connections involving multiple nodes.

Figure 5A:
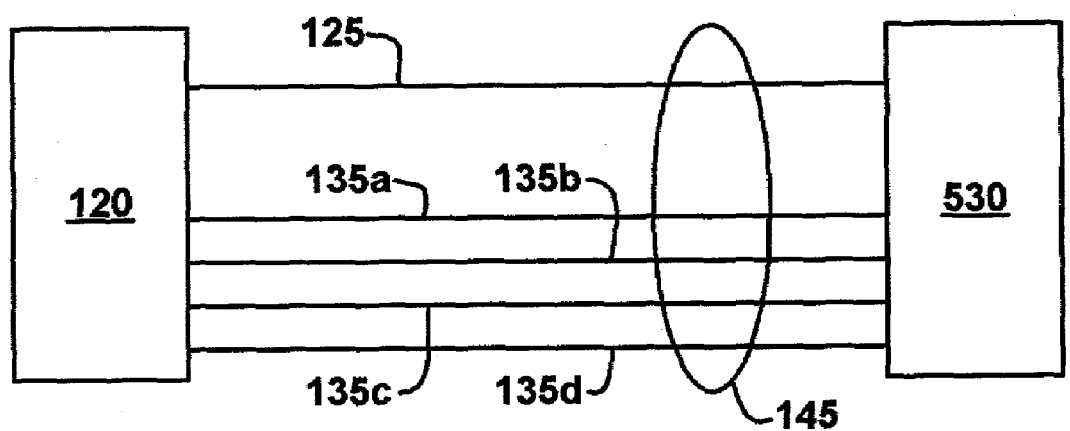
FIG. 5A is a diagram illustrating a node having multiple connections logically associated with a first connection, in accordance with embodiments of the present invention.

For example, referring to FIG. 5A, a client node 120 has a single first connection 125 and multiple second connections 135a-135d to a node 530. For example, the client 120 may be connecting to a switch 530 with a Telnet interface. The client 120 makes a first connection 125 to the switch 530. If the client 120 wishes to examine another aspect of the switch's operation, the client 120 may need another connection to the switch 530. However, the client 120 does not wish to drop the first connection 125 or to have to re-enter passwords, etc. to establish the second connection 135. An embodiment of the present invention allows the client 120 to spawn another version of the applet 171 and to establish another connection 135 to the switch 530 without any manual intervention. Because the applet 171 sends the datum 171, the switch 530 will recognize that it already has a first connection 125 to the client 120 and will not force the client 120 to drop its first connection 125 or to re-enter passwords, etc. Moreover, the client node 120 may establish multiple additional (second) connections 135a-135d and logically associate these with the first connection 125.

Figure 5B:
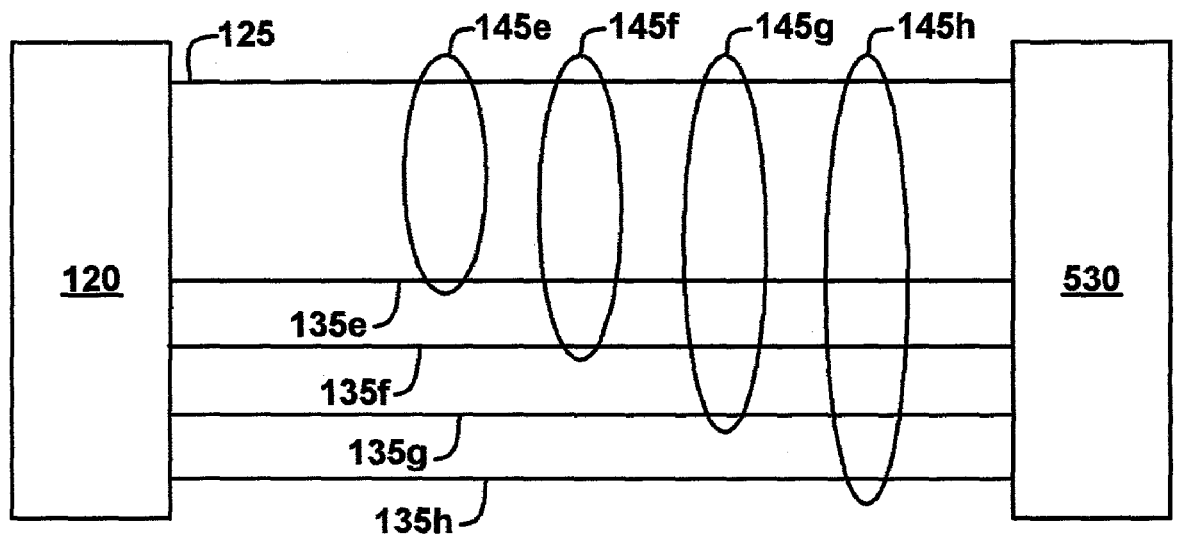
FIG. 5B is a diagram illustrating a node having multiple connections having logical associations with a first connection, in accordance with embodiments of the present invention.

Still referring to FIG. 5A, the logical association 145 is shown between the first connection 125 and multiple second connections 135a-135d. This logical association 145 may be established by the client 120 passing the same datum 161 (e.g., session ID) each time a new connection is established. FIG. 5B shows an embodiment in which there is a logical association 145e-145h between each additional connection 135e-135h and the first connection 125.

Figure 5C:
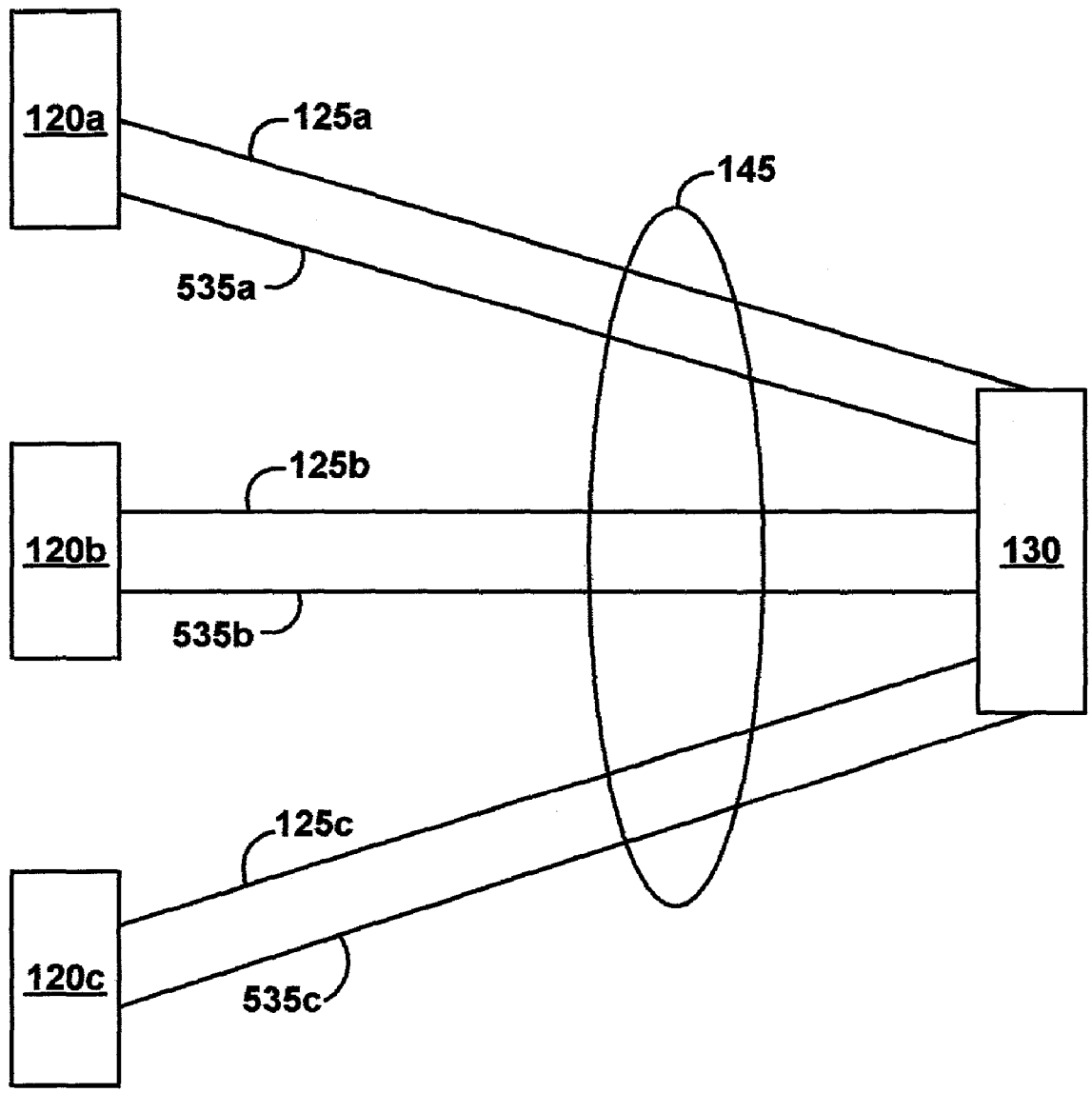
FIG. 5C is a diagram illustrating multiple nodes with their connections logically associated, in accordance with embodiments of the present invention.

Referring now to FIG. 5C, an embodiment of the present invention logically associates connections involving multiple nodes (e.g., multiple client nodes 120). For example, client nodes 120a-120c may be engaged in a game in which each client node 120-120c has established a first connection 125a-125c (e.g., an http connection) to the server 130. Additionally, each client node 120 has established a second connection 535a-535c (e.g., a Telnet connection) to the server 130. The embodiment of FIG. 5C shows a logical association 145 between the connections of multiple client nodes 120.

Figure 6:
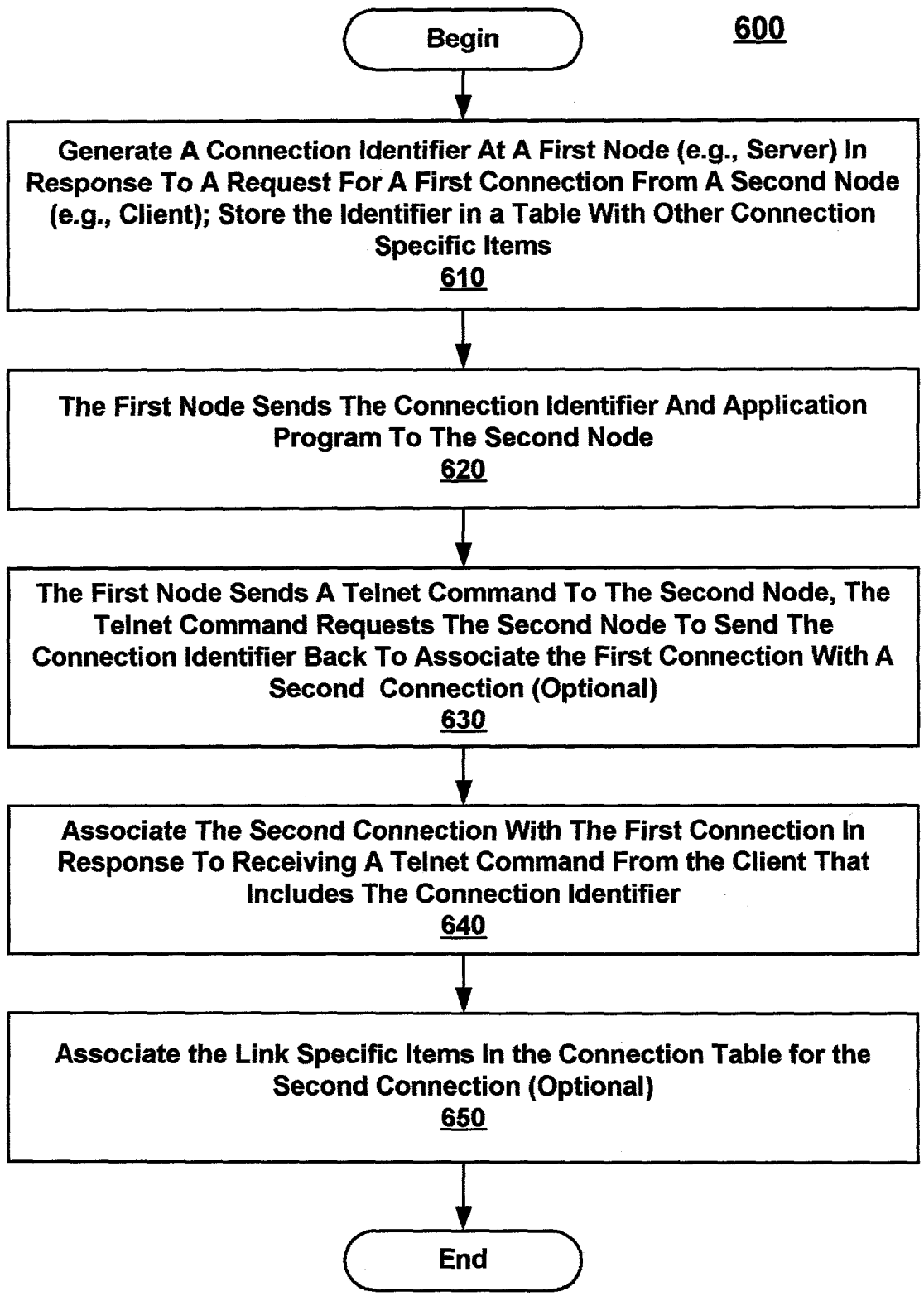
FIG. 6 illustrates steps of a process of a node establishing a logical association between multiple connections made to it, in accordance with embodiments of the present invention.

One embodiment of the present invention provides a method of establishing a logical association 145 between a first connection 125 and a second connection 135. Steps of Process 600 of FIG. 6 may be implemented by executing instructions on a general purpose processor or computer, which may be coupled to a computer-readable medium that stores the instructions. For example, the server 130 may execute steps of Process 600.

In step 610, a first node (e.g., server 130) generates and stores a connection identifier (e.g., datum 161) in response to a request received via a first connection 125 from a second node (e.g., a client node 120). The request may be initiated, for example, when the client 120 wishes to obtain an applet 171 to establish a connection oriented connection and to logically associate the connection oriented connection with the connection used to retrieve the applet 171. Along, with the datum 161, connection specific items may also be stored in a connection table 180.

In step 620, the server 130 sends the connection identifier over a first connection (e.g., the connection used to retrieve the applet 171) to the client 120. In this step, the server 130 may also send application program (e.g., the applet 171) to the client node 120 to allow the client node 120 to interface with the server 130 to associate the first connection 125 with a second connection 135 that will be established later.

In step 630, after the second connection 135 has been established, the server 130 sends a first Telnet command 151 via the second connection 135 to the client 120. The first Telnet command 151 requests the client 120 to send the connection identifier back to associate the first connection 125 with the second connection 135. It will be understood that there may be additional Telnet commands before the first Telnet command. Furthermore, embodiments of the present invention skip this step.

Then, in step 640, in response to receiving a Telnet command 151 from the client 120 that includes the connection identifier, the server 130 establishes a logical association 145 between the first connection 125 and the second connection 135.

In optional step 650, the server 130 associates the link specific items in the connection table 180 with the second connection 135. Process 600 then ends. Process 600 may be expended to cover cases, such as, for example shown in FIGS. 5A-5C, in which multiple nodes and connections are involved.

Figure 7:
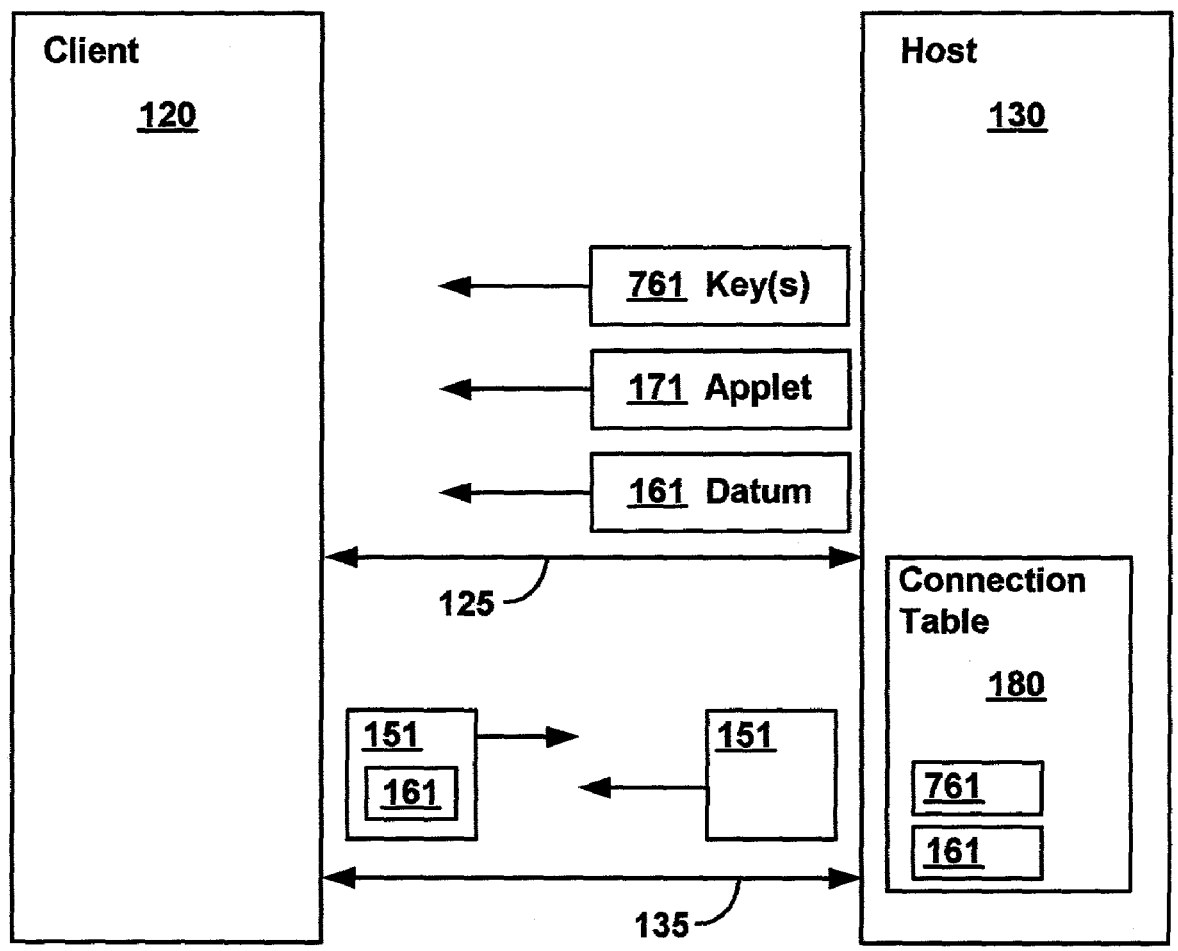
FIG. 7 is a diagram illustrating nodes establishing an encrypted session, in accordance with embodiments of the present invention.

Referring now to FIG. 7, embodiments of the present invention provide for a method of establishing an encrypted data session. For example, it may be desirable that a connection between a client node 120 and a host or server node 130 be encrypted. Furthermore, the client node 120 may be able to connect to the server 130 via a first connection 125, which may be a connectionless connection (e.g., HTTP). However, the client 120 may not have software that allows it to establish and/or communicate via a second connection 135 that may be, for example, a connection oriented protocol. For example, the client 120 may not have software, such as, for example Telnet emulation software that allows the client 120 to interface with a server 130 functioning as a Telnet console. Therefore, embodiments may transfer an applet 171 to the client 120, which the client 120 runs to gain this functionality.

Furthermore, the client 120 and the server 130 may not share the same encryption software. Consequently, embodiments transfer an encryption algorithm to the client, if it is needed. This encryption algorithm may be part of the applet 171. However, in some embodiments the encryption algorithm is a separate application. Furthermore, an encryption key or keys 761 may be transferred to the client 120. Throughout this description, the term encryption key 761 may be used generically to describe a key used in either an encryption or decryption process and thus may be a key to encrypt, or a key to decrypt, or it may perform both functions. The server 130 may also send a datum 161 (e.g., a session identifier) to the client 120. The embodiment of FIG. 7 is illustrated with the server passing encryption key(s) 761; however, embodiments may pass an identifier of the encryption key(s).

The host 130 may store the encryption key or keys 761 and the datum 161 in the connection table 180. In this fashion, when the client node 120 establishes the second connection 135 and transfers the datum 161 in a command 151, the host 130 may use the datum 161 to recognize that the client node 120 communicating on the second connection 135 (e.g., a connection oriented connection) is the same client 120 that was communicating with the host 130 via the first connection 125 (e.g., a connection oriented connection). Next, the two nodes (120, 130) may agree to encrypt the data session on the second connection 135. In this fashion, a client node 120 that does not have a means to establish a connection via the second connection 135 type is able to establish such a connection and have the session encrypted. This may be true even if the client 120 and host 130 did not initially share an encryption algorithm in common.

The commands 151 define the actions to be taken at the nodes (120, 130) and, in one embodiment, instruct the server node 130 to identify the proper encryption key(s) 761 and algorithm to use for an encrypted data session on the second connection 135, in response to the client node 120 sending the datum 161. The second connection 135 may be established by any suitable method, for example, it may be a LAN, WLAN, serial port, modem, etc. The exchange of commands 151 (e.g., Telnet commands) may occur automatically, for example, without the client 120 needing to manually enter data to associate the two connections.

In one embodiment of the present invention, nodes exchange a specially designed Telnet sub-option command or negotiation that allows encryption to be done on a data session between two or more connections. Throughout this application, the sub-option command or negotiation may be referred to as a logical encryption sub-option negotiation. The logical encryption sub-option may be a part of any Telnet option negotiation. For example, in one embodiment the Telnet logical encryption sub-option negotiation is preceded by a Telnet logical encryption option negotiation. In another embodiment, a logical encryption option is followed by a logical associate sub-option negotiation (e.g., 'SNDID'), as described herein.

Figure 8A:
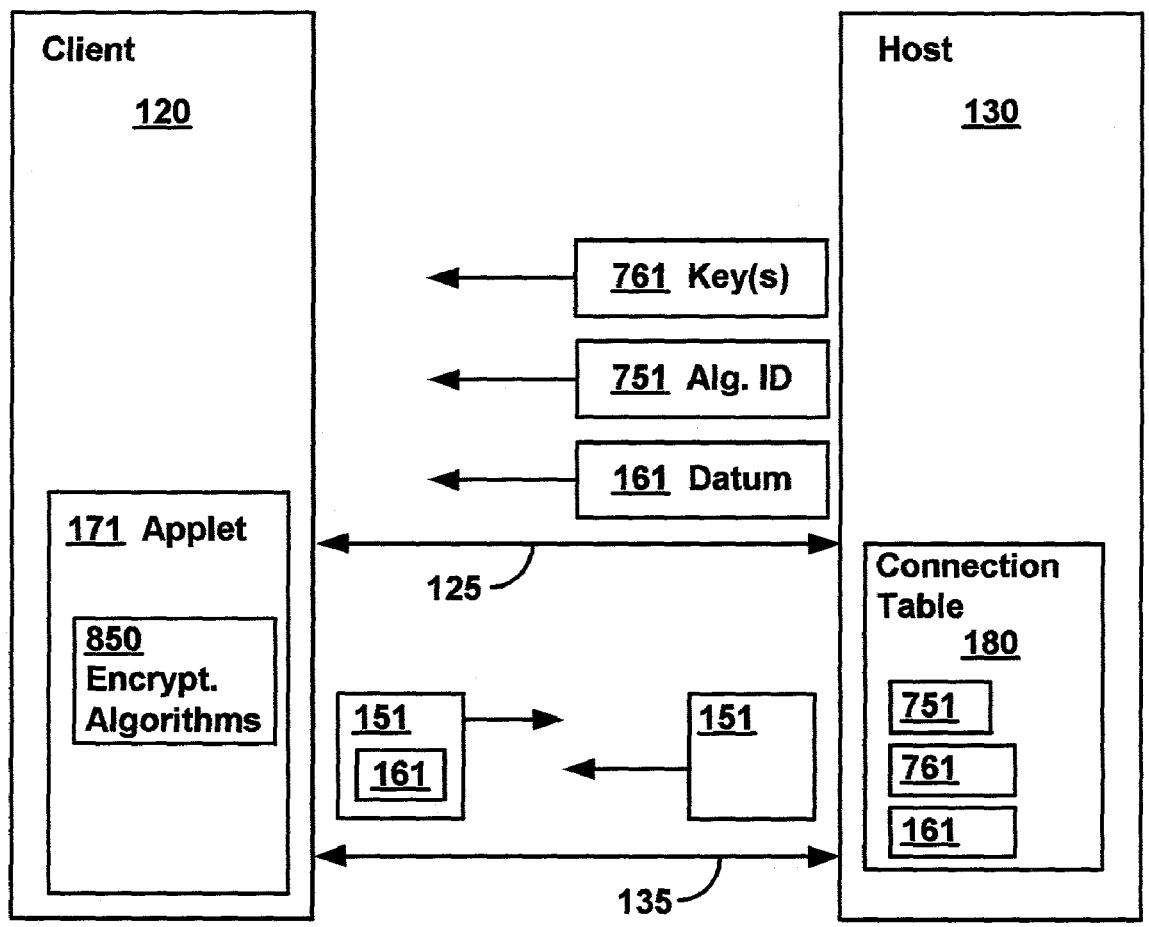
FIG. 8A and FIG. 8B are diagrams illustrating nodes establishing an encrypted session, in accordance with embodiments of the present invention.

FIG. 8A illustrates an embodiment in which the client 120 already has stored thereon an applet 171 that may enable it to establish a second connection 135. Furthermore, the applet 171 may have one or more encryption algorithms 850. The server 130 may pass the client 120 an encryption algorithm identifier 751 to identify which algorithm 850 is to be used for the session on the second connection 135. The server 130 may also store the encryption algorithm identifier 751 in the connection table 180.

Figure 8B:
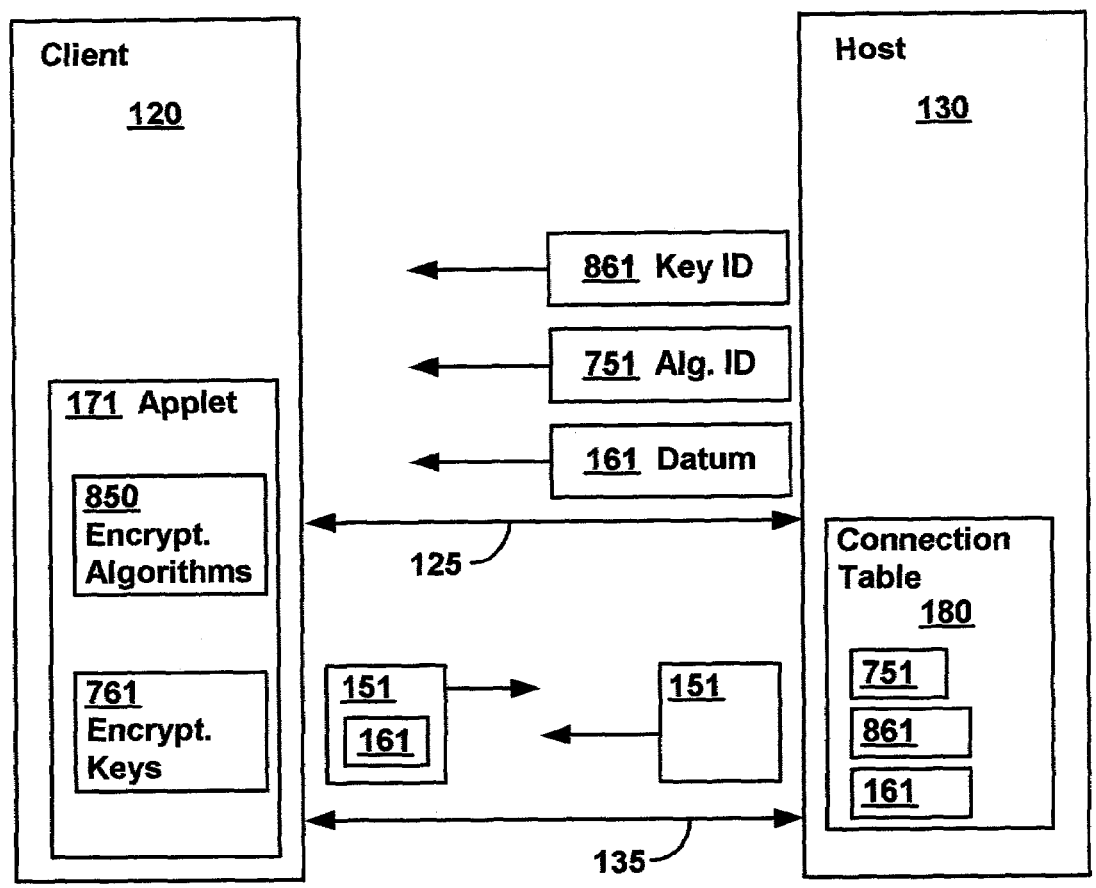

FIG. 8B illustrates another embodiment in which the client 120 already has stored thereon an applet 171 that may enable it to establish a second connection 135. Furthermore, the applet 171 may have one or more encryption algorithms 850. In this embodiment, the client 120 may also have one or more encryption keys 761 stored thereon. The server 130 may pass one or more encryption key identifiers 861. The server 130 may also store the encryption key identifier 861 in the connection table 180.

Figure 9:
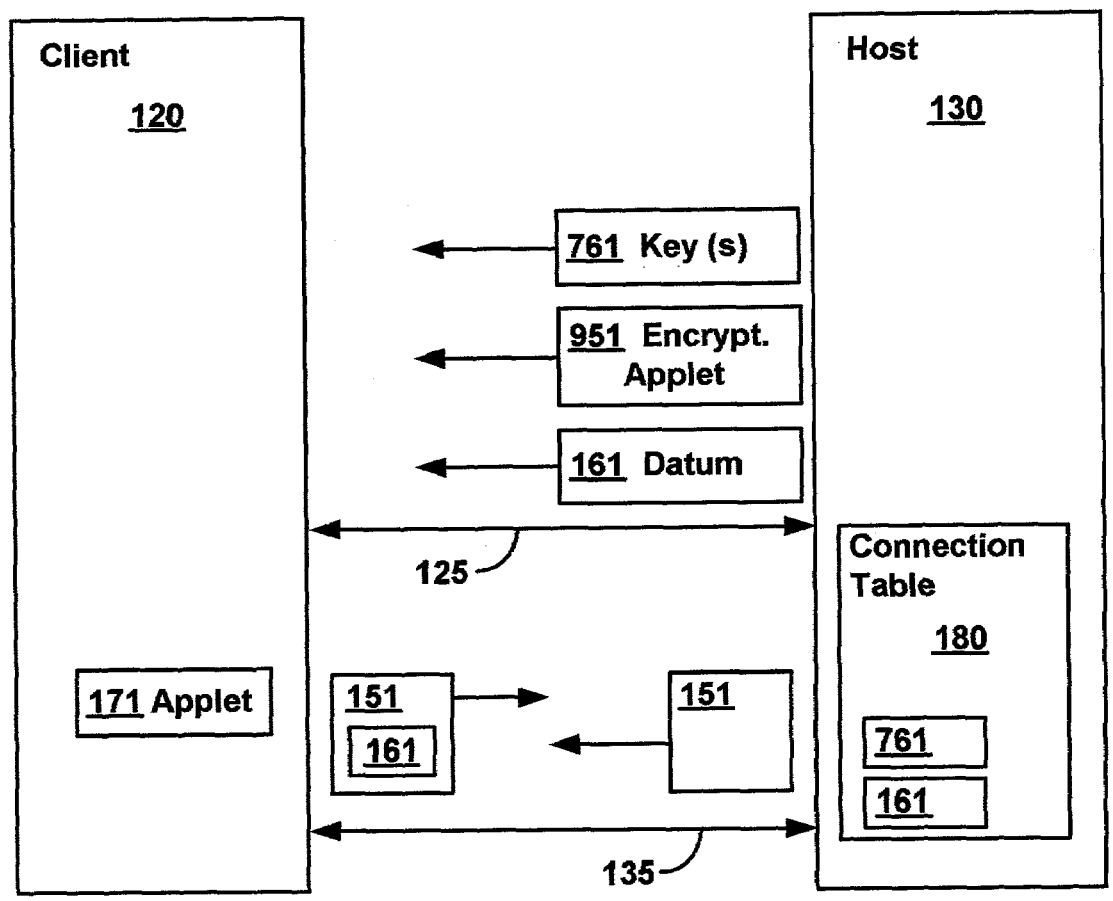
FIG. 9 is a diagram illustrating nodes establishing an encrypted session, in accordance with embodiments of the present invention.

Referring now to FIG. 9, in another embodiment, the client 120 may have stored thereon an applet 171 and the server 130 may pass an encryption algorithm applet 951. For example, the encryption algorithm applet 951 may plug into the applet 171. The server 130 may also pass one or more encryption keys 761. In other embodiments, the client 120 may have stored thereon one or more encryption keys 761 and the server 130 may pass an encryption key identifier 861.

Figure 10:
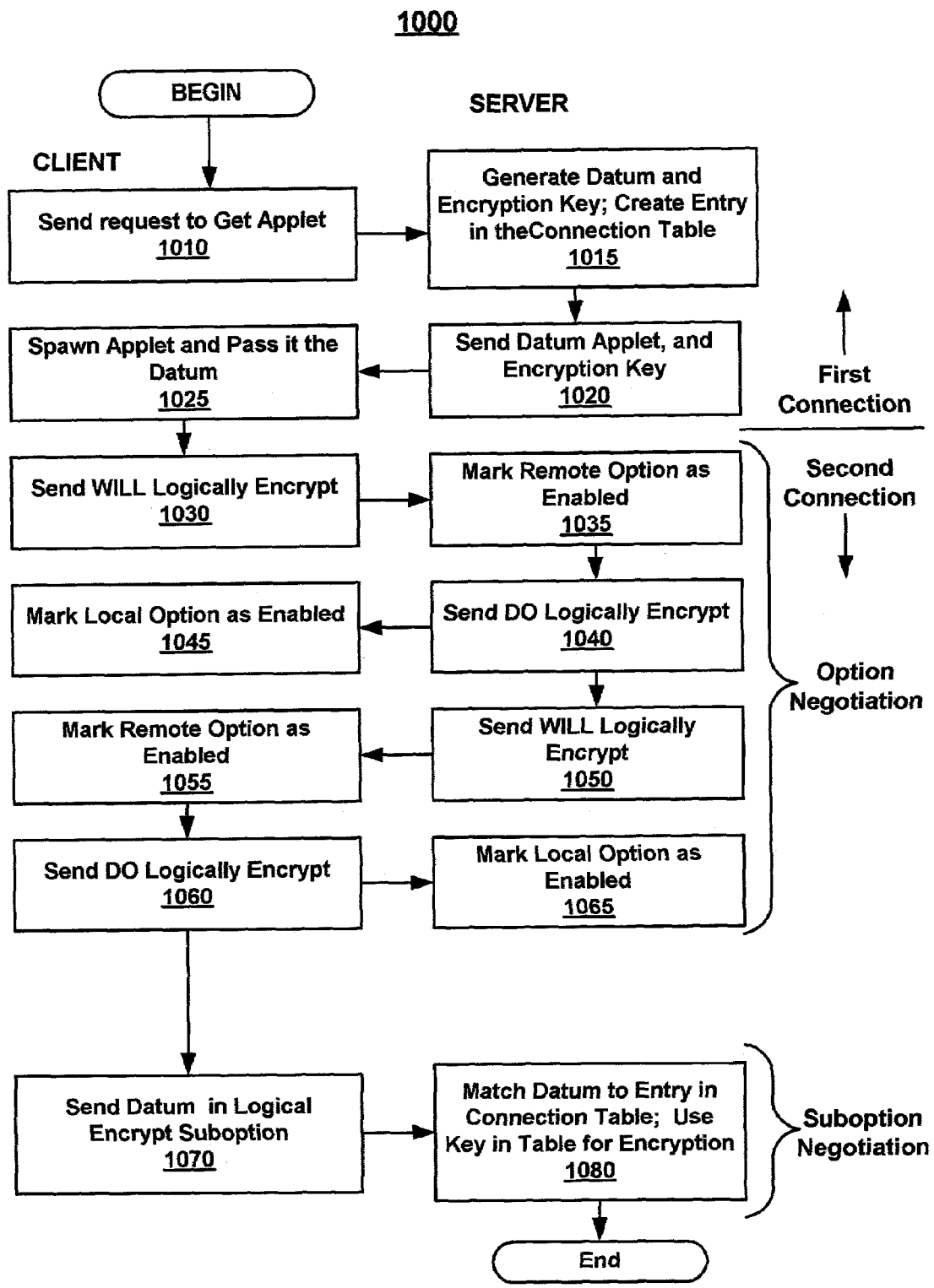
FIG. 10 is a flowchart showing steps of a process of nodes exchanging commands to establish an encrypted session, in accordance with embodiments of the present invention.

Referring to Process 1000 in the flowchart of FIG. 10 and to the table of FIG. 11, the client node 120 initiates the establishment of a first connection 125 to the server node 130, in step 1010. For example, the client node 120 sends an 'HTTP Get index.html' to the server node 130. However, the present invention is not limited to establishing the first connection 125 via HTTP, for example, the first connection 125 may be via SNMP (Simple Network Management Protocol), or any other connection method. The client node's 120 request to the server 130 may indicate that the client 120 desires to establish a second connection 135 and that it be encrypted.

In step 1015, when the server node 130 receives the request, the server node 130 generates a datum 161, which may be used to link the first connection 125 to the second connection 135. For example, the datum 161 may be a session identifier, a connection identifier, or any other identifier to allow the server 130 to recognize, when communicating with a node via a second connection 135, that the node sending it is the node that had the first connection 125. The server node 130 may store the datum 161 in a connection table 180, which also includes connection specific items.

Also in step 1015, the server 130 may generate an encryption key 761 (or keys) and store it in the connection table 180. By associating the encryption key(s) 761 and other items with the datum 161 in the connection table 180, the server 130 may later identify the client node 120 with this encryption key 761, even though the client node 120 is communicating with the server 130 via a different connection (e.g., the second connection 135).

Still referring to step 1015, the server node 130 may also store other items in the connection table 180 such as, for example, an encryption key identifier 861 and/or an encryption algorithm identifier 751.

In step 1020, the server node 130 may send the datum 161 and an applet 171 to the client node 130. Additionally, the server node 130 may send contextual information such as, for example, user access level, encryption keys 761, an encryption key identifier 861, security levels, an encryption algorithm identifier 751, etc. Furthermore, the server node 130 may send an encryption algorithm applet 951 separate from the applet 171 (for example, in embodiments in which the applet 171 is not sent).

In step 1025, when the client 130 receives the applet 171, the applet 171 is spawned and passed the datum 161. The applet 171 then attempts to establish a second connection 135 to the server 130. In the present embodiment, the client node 120 and the server node 130 first engage in a specially defined Telnet option negotiation to establish that both nodes wish to support the logical encryption option. Then, the two nodes engage in a specially defined Telnet sub-option negotiation to cause an encrypted session to be established. This session may be established without negotiating the specific encryption algorithm that will be used. Furthermore, the encrypted session may be established using whatever encryption algorithm the server 130 identified and stored in the connection table 180 at the time the first connection 125 was established.

Thus, after the second connection 135 is established, the client node 120 sends a 'WILL logically encrypt' request to indicate that the client node 120 wants to enable the logical encrypt option, in step 230. The client 120 may send the string 'WILL LOGICAL_ENCRYPT,' to accomplish this. Referring to the Table of FIG. 11, this may have the hexadecimal value of 'ff fb XX.' As stated herein, the value of the LOGICAL_ENCRYPT option may be any unused value in the Telnet protocol. Throughout this description, the entire string just described and similar strings may be defined as a Telnet command.

In step 1035, when the server node 130 receives the request, it marks the remote option as enabled. Then, in step 1040, the server node 130 sends a 'DO logically encrypt' to indicate that the client 120 may enable the option for logical encrypt. The server 130 may send the string 'IAC DO LOGICAL_ENCRYPT' to accomplish this. Referring to the Table of FIG. 11, the hexadecimal values for this string may be 'ff fd XX.' Again, the LOGICAL_ENCRYPT value of XX hexadecimal is exemplary.

In step 1045, in response to the 'DO request' from the server 130, the client node 120 marks the local option as enabled.

Next in step 1050, the server 130 sends a 'WILL logically encrypt' request to indicate it wants to enable the option for logical encrypt on its side. The server 120 may send the string, 'IAC WILL LOGICAL_ENCRYPT' to accomplish this. The hexadecimal values for this string may be 'ft fb XX.' Again, the LOGICAL_ENCRYPT value of XX hexadecimal is exemplary.

In response to the 'WILL request,' the client 120 marks the remote option as enabled, in step 1055. Then, the client 120 sends a 'DO logically encrypt' request to indicate that the server 130 may enable the option for logical encryption on the server 130, in step 1060. The client 120 may send the string 'IAC DO LOGICAL_ENCRYPT' to accomplish this. The hexadecimal values for this string may be 'ff fd XX.' Again, the LOGICAL_ENCRYPT value of XX hexadecimal is exemplary.

Upon receiving the 'DO request,' the server 130 marks the local option as enabled, in step 1065. In step 1070, the client 120 sends the logical encryption option and sub-option, along with the datum 161. For example, it may send the string, 'IAC SB LOGICAL_ENCRYPT SNDID DATUM IAC SE.' This may have the hexadecimal value of 'ff fa XX 2a 2f <DATUM> ff f0.'

In step 1080, the server 130 may take a series of actions. First, the server 130 verifies that the datum 161 is valid. For example, it verifies that the datum 161 is in the connection table 180. Furthermore, the server 130 may associate connection specific items that are in the connection table 180 with the second connection 135. For example, it uses an encryption key or keys 761 in the table 180 for encrypting and decrypting data during a session on the second connection 135. At this point, the exchange of commands is complete.

The Process 1000 of FIG. 10 may be varied in a number of fashions. For example, in one embodiment, the datum 161 is sent (see, e.g., step 1070) before the exchange of WILL and DO logically encrypt commands (see, e.g., steps 1030-1065). In this embodiment, the server 130 does not associate the encryption key(s) 761 in the connection table 180 with the first connection 125 until the exchange of logically encrypt WILL and DO commands is complete.

The process 1000 of FIG. 10 may be combined with other embodiments described herein. For example, referring again to FIG. 5A, a node 120 may have a first connection 125 and then establish a number of second connections 135a-135d to a switch 530. Embodiments allow the client node 120 and switch 530 to use the same encryption keys 761 and encryption algorithm 850 by associating the second connections 135a-135d, with the first connection 125.

Still referring FIG. 5A, a client 120 may spawn another version of the applet 171 and establish additional connections 135a-135d to the switch 530 without any manual intervention. Because the applet 171 sends the datum 161, the switch 530 will recognize that it already has a first connection 125 to the client 120 and will not force the client 120 to drop its first connection 125 or to negotiate an encryption algorithm 850 or exchange encryption keys 761 as that information is stored in the connection table 180 on the switch 530.

Embodiments of the present invention allow multiple client nodes 120 to share the same encryption keys 761, if desired. Referring again to FIG. 5C, multiple client nodes 120a-120c may be, for example, engaged in a game in which each client node 120-120c has established a first connection 125a-125c (e.g., an http connection) to the server 130. Additionally, each client node 120 has established a second connection 535a-535c (e.g., a Telnet connection) to the server 130. Each client node 120a-120c may be given the same encryption key 761 and the server 130 may store that same key 761 in one or more connection tables 180, along with a datum 161 that the client nodes 120a-120c pass back on the second connections 535a-535c. If, for example, the client nodes 120a-120c are networked to each other, they may then share the data in its encrypted form, using the common encryption/decryption keys 761.

While the present invention has been described in particular embodiments, it should be appreciated that the present invention should not be construed as limited by such embodiments, but rather construed according to the below claims.

What is claimed is:

1. A method of establishing an encrypted session, said method comprising:
    a) sending a session identifier from a first node to a second node via a first connection:
    b) sending a first element to said second node, wherein said first element is an encryption algorithm:
    c) sending a second element selected between an encryption key and an identifier of said encryption key to said second node:
    d) receiving from said second node, via a second connection, a command indicating an encrypted session is desired wherein said first connection is of a different type than said second connection; and
    e) in response to receiving a command including said identifier of said encryption key via said second connection, establishing said encrypted session, said session using said encryption algorithm, wherein said encrypted session is established without requiring negotiation regarding said encryption algorithm to be used.

2. The method of claim 1, wherein b) comprises sending said first element on said first connection.

3. The method of claim 1, wherein c) comprises sending said second element on said first connection.

4. The method of claim 1, wherein said first connection is a connectionless connection and said second connection is a connection oriented connection.

5. The method of claim 1, wherein said first connection is a hypertext transport protocol (HTTP) connection and said second connection is a Telnet connection.

6. The method of claim 1, wherein said commands transferred in d) and e) are Telnet commands.

7. The method of claim 1, further comprising sending an application program that is operable to enable said second node to communicate via said second connection.

8. The method of claim 7, wherein said application program is operable to enable said second node to perform Telnet emulation.

9. The method of claim 7, wherein d) comprises said application program sending said command indicating said encrypted session is desired.

10. The method of claim 7, wherein e) comprises said application program sending said command including said identifier of said encryption key.

11. The method of claim 1, further comprising storing said identifier of said encryption key and said encryption key at said first node.

12. The method of claim 1, further comprising storing said encryption algorithm identifier at said first node.

13. The method of claim 1, wherein b) comprises sending said first element on said second connection.

14. The method of claim 1, wherein c) comprises sending said second element on said second connection.

15. The method of claim 1, further comprising:
f) receiving from said second node, via a third connection, a command indicating an encrypted session is desired on said third connection; and
g) in response to receiving a command including said identifier of said encryption key via said third connection, establishing said encrypted session on said third connection, said session using said encryption key and said encryption algorithm.

16. The method of claim 1, wherein:
a) further comprises sending said session identifier to a plurality of nodes via a plurality of first connections, said plurality of nodes including said second node in a) and said plurality of first connections including said first connection in a);
b) further comprises sending said first element selected between said encryption algorithm and said identifier of said encryption algorithm to said plurality of nodes via said plurality of first connections;
c) further comprises sending said second element selected between said encryption key and said identifier of said encryption key to said plurality of nodes via said plurality of first connections;
d) receiving from said plurality of nodes, via a plurality of second connections, said plurality of second connections including said second connection, a plurality of commands indicating encrypted sessions are desired; and
e) in response to receiving a plurality of commands including said identifier of said encryption key via said plurality of second connections, establishing said encrypted sessions.

17. A computer readable medium having stored thereon instructions, which when run on a processor execute a method of establishing an encrypted data session, said method comprising:
a) storing a datum and an encryption key;
b) sending said datum and an element selected between said encryption key and an encryption key identifier to a second node via a first connection;
c) sending to said second node via said first connection an application program for establishing an encrypted session on a second connection, wherein said first connection is of a different type than said second connection;
d) establishing a logical association between said first connection and said second connection in response to receiving on said second connection a Telnet command that includes said datum; and
e) using said encryption key, encrypting data during a session on said second connection.

18. The computer readable medium of claim 17, wherein said application program is operable to perform an encryption algorithm that is compliant with the data encryption standard (DES).

19. The computer readable medium of claim 17, wherein d) of said method further comprises:
d1) receiving a Telnet command which requests that data transfers on said second connection be encrypted.

20. The computer readable medium of claim 17, wherein d) of said method further comprises associating said encryption key with said datum.

21. A method of establishing an encrypted session, said method comprising:
a) storing an identifier and an encryption key at a first node;
b) said first node sending said identifier and said encryption key to a second node over a first connection that is of a first communication type;
c) said first node sending said second node an application program for communicating via a second communication type and for performing an encryption algorithm;
d) said first node and said second node exchanging at least one Telnet command to associate said first connection with a second connection that is of said second communication type, wherein said first connection is of a different type than said second connection;
e) said first node and said second node exchanging at least one Telnet command to establish that a session on said second connection will be encrypted; and
f) said first node and said second node engaging in an encrypted session via said second connection using said encryption key.

22. The method of claim 21, wherein a) further comprises said first node generating said identifier and said encryption key.

23. The method of claim 21, wherein a) further comprises storing an identifier of said encryption algorithm at said first node.

24. The method of claim 21, further comprising:
g) said first node and said second node exchanging at least one Telnet command to associate said first connection with a third connection that is of said second communication type;
h) said first node and said second node exchanging at least one Telnet command to establish that a session on said third connection will be encrypted; and
i) said first node and said second node engaging in an encrypted session via said third connection using said encryption key.

* * * * *

UNITED STATES PATENT AND TRADEMARK OFFICE
CERTIFICATE OF CORRECTION

PATENT NO. : 7,263,192 B2  
APPLICATION NO. : 10/103020  
DATED : August 28, 2007  
INVENTOR(S) : Keven P. Morlang et al.

Page 1 of 1

It is certified that error appears in the above-identified patent and that said Letters Patent is hereby corrected as shown below:

In column 12, line 43, in Claim 1, after "connection" delete ":" and insert -- ; --, therefor.

In column 12, line 45, in Claim 1, after "algorithm" delete ":" and insert -- ; --, therefor.

In column 12, line 49, in Claim 1, after "node" delete ":" and insert -- ; --, therefor.

Signed and Sealed this

Eighth Day of September, 2009

David J. Kappos  
*Director of the United States Patent and Trademark Office*